United States Patent
Pravetz et al.

(10) Patent No.: US 9,705,917 B2
(45) Date of Patent: *Jul. 11, 2017

(54) DOCUMENT MODIFICATION DETECTION AND PREVENTION

(71) Applicant: Adobe Systems Incorporated, San Jose, CA (US)

(72) Inventors: James D. Pravetz, Sunnyvale, CA (US); Krish Chaudhury, Saratoga, CA (US); Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,812

(22) Filed: Mar. 25, 2016

(65) Prior Publication Data
US 2016/0226909 A1    Aug. 4, 2016

Related U.S. Application Data

(63) Continuation of application No. 13/965,688, filed on Aug. 13, 2013, now Pat. No. 9,338,011, which is a
(Continued)

(51) Int. Cl.
*G06F 7/04*    (2006.01)
*H04L 29/06*    (2006.01)
(Continued)

(52) U.S. Cl.
CPC .......... *H04L 63/18* (2013.01); *G06F 21/6218* (2013.01); *H04L 9/3247* (2013.01)

(58) Field of Classification Search
CPC ...................................................... G06F 21/64
(Continued)

(56) References Cited

U.S. PATENT DOCUMENTS 5,199,073 A    3/1993  Scott
5,204,897 A    4/1993  Wyman
(Continued)

FOREIGN PATENT DOCUMENTS

EP    0 565 314    10/1993
EP    1 077 414    2/2001
(Continued)

OTHER PUBLICATIONS

Tanis et al., "Document integrity through mediated interfaces," DARPA Information Survivability Conference & Exposition II, 2001. DISCEX '01. Proceedings Year: 2001, vol. 2 pp. 263-270.*
(Continued)

*Primary Examiner* — Roderick Tolentino
(74) *Attorney, Agent, or Firm* — Finch & Maloney PLLC (57) ABSTRACT

Methods and apparatus, including computer program products, implementing and using techniques for document authentication. An electronic document is presented to a user. The electronic document has data representing a signed state and a current state. A disallowed difference between the signed state and the current state is detected, based on one or more rules that are associated with the electronic document. A digital signature associated with the electronic document is invalidated in response to the detecting.

17 Claims, 3 Drawing Sheets

Related U.S. Application Data continuation of application No. 12/795,502, filed on Jun. 7, 2010, now Pat. No. 8,533,480, which is a continuation of application No. 10/440,487, filed on May 16, 2003, now Pat. No. 7,735,144.

(51) Int. Cl.
*G06F 21/62* (2013.01)
*H04L 9/32* (2006.01)

(58) Field of Classification Search
USPC .................................................... 726/26–30
See application file for complete search history.

(56) References Cited

U.S. PATENT DOCUMENTS

| | | | |
|---|---|---|---|
| 5,226,159 A | 7/1993 | Henson et al. | |
| 5,260,999 A | 11/1993 | Wyman | |
| 5,341,429 A | 8/1994 | Stringer et al. | |
| 5,438,508 A | 8/1995 | Wyman | |
| 5,465,299 A | 11/1995 | Matsumoto et al. | |
| 5,509,070 A | 4/1996 | Schull | |
| 5,673,316 A | 9/1997 | Auerbach et al. | |
| 5,708,709 A | 1/1998 | Rose | |
| 5,745,879 A | 4/1998 | Wyman | |
| 5,765,152 A | 6/1998 | Erickson | |
| 5,818,447 A | 10/1998 | Wolf et al. | |
| 5,892,904 A | 4/1999 | Atkinson et al. | |
| 5,912,974 A * | 6/1999 | Holloway | H04N 1/32133 380/51 |
| 5,940,843 A | 8/1999 | Zucknovich et al. | |
| 6,076,166 A | 6/2000 | Moshfeghi et al. | |
| 6,154,757 A | 11/2000 | Krause et al. | |
| 6,249,794 B1 | 6/2001 | Raman | |
| 6,266,654 B1 | 7/2001 | Schull | |
| 6,282,552 B1 | 8/2001 | Thompson et al. | |
| 6,327,578 B1 | 12/2001 | Linehan | |
| 6,343,297 B1 | 1/2002 | D'Anjou et al. | |
| 6,357,004 B1 | 3/2002 | Davis | |
| 6,393,438 B1 | 5/2002 | Kathrow et al. | |
| 6,529,905 B1 | 3/2003 | Bray et al. | |
| 6,671,805 B1 | 12/2003 | Brown et al. | |
| 6,772,340 B1 | 8/2004 | Peinado et al. | |
| 6,775,655 B1 | 8/2004 | Peinado et al. | |
| 6,796,489 B2 | 9/2004 | Slater et al. | |
| 6,824,051 B2 | 11/2004 | Reddy et al. | |
| 6,829,708 B1 | 12/2004 | Peinado et al. | |
| 6,876,984 B2 | 4/2005 | Tadayon et al. | |
| 6,895,503 B2 | 5/2005 | Tadayon et al. | |
| 6,970,866 B1 | 11/2005 | Pravet et al. | |
| 6,973,445 B2 | 12/2005 | Tadayon et al. | |
| 6,973,618 B2 | 12/2005 | Shaughnessy et al. | |
| 6,990,504 B2 | 1/2006 | Powell et al. | |
| 7,003,107 B2 | 2/2006 | Ananth | |
| 7,010,750 B2 | 3/2006 | Burky | |
| 7,010,808 B1 | 3/2006 | Leung et al. | |
| 7,024,393 B1 | 4/2006 | Peinado et al. | |
| 7,031,943 B1 | 4/2006 | James et al. | |
| 7,051,005 B1 | 5/2006 | Peinado et al. | |
| 7,051,364 B1 * | 5/2006 | Tackman | H04L 9/3247 705/80 |
| 7,069,443 B2 | 6/2006 | Berringer et al. | |
| 7,213,269 B2 | 5/2007 | Orthlieb et al. | |
| 7,240,205 B2 | 7/2007 | Green et al. | |
| 7,249,314 B2 | 7/2007 | Walker et al. | |
| 7,278,168 B1 | 10/2007 | Chaudhury et al. | |
| 7,327,481 B2 | 2/2008 | Such et al. | |
| 7,505,605 B2 | 3/2009 | Rhoads et al. | |
| 7,562,053 B2 | 7/2009 | Twining et al. | |
| 7,698,559 B1 | 4/2010 | Chaudhury et al. | |
| 7,707,116 B2 | 4/2010 | Walker et al. | |
| 7,877,607 B2 | 1/2011 | Circenis et al. | |
| 8,660,960 B2 | 2/2014 | Chaudhury et al. | |
| 2001/0011350 A1 * | 8/2001 | Zabetian | G06Q 20/3821 713/176 |
| 2001/0034835 A1 | 10/2001 | Smith | |
| 2002/0002543 A1 | 1/2002 | Spooren et al. | |
| 2002/0013765 A1 | 1/2002 | Schwartz | |
| 2002/0019838 A1 | 2/2002 | Petrogiannis | |
| 2002/0029200 A1 | 3/2002 | Dulin et al. | |
| 2002/0042884 A1 | 4/2002 | Wu et al. | |
| 2002/0085710 A1 * | 7/2002 | Ananth | H04L 9/065 380/37 |
| 2002/0184267 A1 * | 12/2002 | Nakao | G06F 17/30719 715/255 |
| 2003/0014483 A1 | 1/2003 | Stevenson et al. | |
| 2003/0028774 A1 | 2/2003 | Meka | |
| 2003/0078880 A1 * | 4/2003 | Alley | G06F 21/645 705/38 |
| 2003/0105816 A1 | 6/2003 | Goswami | |
| 2003/0182402 A1 | 9/2003 | Goodman | |
| 2003/0217008 A1 | 11/2003 | Habegger et al. | |
| 2003/0221105 A1 * | 11/2003 | Bajaj | G06F 21/64 713/176 |
| 2004/0006543 A1 * | 1/2004 | Twining | G06F 21/64 705/80 |
| 2004/0054908 A1 * | 3/2004 | Circenis | G06F 21/10 713/176 |
| 2004/0148508 A1 * | 7/2004 | Alev | G06F 21/64 713/180 |
| 2004/0158731 A1 | 8/2004 | Narin et al. | |
| 2004/0181756 A1 | 9/2004 | Berringer | |
| 2005/0057488 A1 | 3/2005 | White | |

FOREIGN PATENT DOCUMENTS

| | | |
|---|---|---|
| EP | 1 227 613 | 7/2002 |
| EP | 1 398 078 | 3/2004 |
| JP | 8-194748 | 7/1996 |
| JP | 11-212910 | 8/1999 |
| JP | 2002-41482 | 2/2002 |
| JP | 2002-197069 | 7/2002 |
| WO | 00/54128 | 9/2000 |
| WO | 01/61508 | 8/2001 |
| WO | 03/007180 | 1/2003 |

OTHER PUBLICATIONS

Piva et al., "Managing copyright in open networks," IEEE Internet Computing Year: 2002, vol. 6, Issue: 3 pp. 18-26.*
Adobe Systems Incorporated. "Adobe Acrobat 4.0 and Digital Signatures," Adobe Acrobat 4.0, Nov. 1999, pp. 1-4.
Adobe Systems Incorporated. "Digitally Sign PDF Documents," Adobe Acrobat 5.0, 2001, pp. 1-3.
Itaru Hosomi et al., "Digital Information Logistics Achitecture 'Medical Shell' and its Billing Utilizing Management", Information Process Society Research Report, vol. 98, No. 85, IPSJ SIG Notes, Japan, Information Processing Society of Japan, Oct. 12, 1998, vol. 98, pp. 49-56.
Menezes, et al. "Handbook of Applied Cryptography," CRC Press, 1997, pp. 33 and 321-383.
Microsoft: "Online Help—Word disk" Feb. 6, 2001, pp. 1-6, IBN XP002310447.
Ortiz, Jr., S. "E-mail Protection Advances with New Technologies," Computer, vol. 33, No. 1 (Jan. 2000), pp. 21-23.
Rubin' C. "Editing a Macro with the Macro Recorder" in: Running Microsoft® Word 2000, 1999, Chapter 29, pp. 563-666.
Schneier, B. "Protocol Building Blocks," Applied Cryptography. Protocols, Algorithms, and Source Code in C, 1996, Chapter 2, pp. 34-44.
Simon, et al. "An Introduction to XML Digital Signatures," [online], [retrieved on Feb. 18, 2004]. Retrieved from the Internet: http://www.xml.com/pub/a/2001/08/08xmldsig.html, 8 pages.
First Office Action, for Canadian Application No. 2,462,818, dated Jun. 14, 2010, 5 pages.
Decision of Rejection, for Japanese Application No. 2003-571898, dated May 11, 2010, 5 pages.

(56) References Cited

OTHER PUBLICATIONS

Tallis et al., "Document integrity through mediated interfaces," DARPA Infomation Survivability Conference & Exposition II, 2001. DISCEX '01. Proceedings Year: 2001, vol. 2 pp. 263-270.

* cited by examiner

DOCUMENT MODIFICATION DETECTION AND PREVENTION

This application is a continuation of U.S. patent application Ser. No. 13/965,688 (filed 13 Aug. 2013), which is a continuation of U.S. patent application Ser. No. 12/795,502 (filed 7 Jun. 2010; now U.S. Pat. No. 8,533,480), which is a continuation of U.S. patent application Ser. No. 10/440,487 (filed 16 May 2003; now U.S. Pat. No. 7,735,144). The entire contents of all of these priority applications is hereby incorporated by reference herein.

BACKGROUND OF THE INVENTION

The present invention relates to document authentication. The use of electronic documents is gaining popularity and a variety of different formats of electronic documents exist that can be processed by different computer software applications. One example of a common, platform-independent type of electronic document is a PDF (Portable Document Format) document, which has been developed by Adobe Systems Incorporated, San Jose, Calif. PDF documents can be read by PDF readers, such as Adobe® Acrobat® and Adobe® Acrobat® Reader®, or other types of software applications.

While electronic documents are convenient from many points of view, they also present new problems that do not have to be addressed for regular paper documents. One example of such a problem is that an electronic document can be modified in different ways than a conventional printed paper document. Malicious users may, for example, manipulate an electronic document such that the document no longer reflects what the author originally wrote.

SUMMARY OF THE INVENTION

In general, in one aspect, this invention provides methods and apparatus, including computer program products, implementing and using techniques for document authentication. An electronic document is presented to a user. The electronic document has data representing a signed state and a current state. An unauthorized difference between the signed state and the current state is detected, based on one or more rules that are associated with the electronic document. A digital signature associated with the electronic document is invalidated in response to the detecting.

Advantageous implementations can include one or more of the following features. The signed state of the electronic document can be presented to the user. The electronic document can include an object hash representing the signed state of the electronic document. The object hash can be generated subject to the rules that are associated with the electronic document. The object hash can be based on content items of the electronic document that are invariant to a set of one or more operations authorized by the rules associated with the electronic document. The set of one or more operations can be authorized by an author providing the signed state of the electronic document. Detecting a difference can include generating an object hash of the current state according to a set of rules associated with the signed state of the electronic document and comparing the generated object hash with the object hash in the electronic document.

The electronic document can include a byte range hash. Detecting a difference can include generating a byte range hash according to a saved version of the electronic document and comparing the generated byte range hash with the byte range hash in the electronic document. The difference between the signed state and the current state can relate to one or more of the following operations performed on data in the electronic document: digitally signing the electronic document, entering data into predefined fields of the electronic document, and annotating the electronic document. An input defining a second signed state can be received and a difference between the second signed state and the current state can be detected.

A digital signature relating to the second signed state can be invalidated if the detected difference between the current state and the second signed state represents a difference that is not permitted by the rules associated with the electronic document. A digital signature associated with the electronic document can be validated prior to detecting a difference. Invalidating the digital signature can include invalidating the digital signature if the detected difference between current state and the signed state represents a difference that is not permitted by an author providing the digital signature.

The invention can be implemented to realize one or more of the following advantages. An author or content provider can ensure that individual users can only make changes to an electronic document that are allowed by the author of the electronic document. The allowed changes can be governed by rules that the author defines for the object, and/or rules that are defined for a recipient of the document. Together these two types of rules define permissions authorizing the recipient to perform operations on the document. Generating a digitally signed digest of objects invariant to authorized changes provides a mechanism for detecting unauthorized changes to the document. This enables workflows in which the author of an electronic document can control to what extent a particular electronic document can be changed. One example of such a workflow might feature a government agency, such as the Internal Revenue Service (IRS), that would like to distribute forms (such as tax forms) electronically to a large number of recipients. At the same time, the agency has the ability to limit the ways in which users can make changes in the document—for example, by limiting what fields can be changed and what type of changes can be made to those fields. If a user with malicious intent manages to make unauthorized changes to an electronic document, for example, by using a different software application than the application in which the electronic document is normally used, the unauthorized changes will be discovered when the document is opened again in the application. A user may also view (or "roll back" to) a signed state of the electronic document, since the electronic document includes both the signed state and the current state both are part of the same electronic document. This functionality can also make it possible to display the differences between the signed state and the current state, and remove any unauthorized changes from the current state of the electronic document. The author may also completely prevent any recipients of the electronic document from making changes. For example, a company may put out a press release in an electronic document and add a rule preventing any changes from being made to the press release. The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The document modification and prevention techniques that will be described below enable controlled interaction between two major categories of people or entities: document authors and document users. Related techniques have been described in the following three copending patent applications, which are also incorporated by reference in their entireties: U.S. Ser. No. 10/080,923, filed on Feb. 21, 2002; U.S. Ser. No. 10/306,635, filed on Nov. 27, 2002; and U.S. Ser. No. 10/306,779, also filed on Nov. 27, 2002. A document author is someone who for a particular electronic document defines a set of rules that specify what parts of an electronic document are allowed to change as a result of user interaction with the document. A user is generally a person or an entity for which the electronic document is intended. The user is only allowed to make modifications to the electronic document that do not violate the rules that the author has defined for the electronic document. If the user tries to make changes that are not allowed by the author, the electronic document will be classified as invalid, for example, by invalidating a signature that the author has added to the document. An electronic document, as used herein, refers to a collection of information that can be read or otherwise processed as a single unit in a computer or some type of electronic document reader. A document can contain plain or formatted text, graphics, sound, other multimedia data, scripts, executable code, or hyperlinks to other documents. An electronic document does not necessarily correspond to a file. A document may be stored in a portion of a file that holds other documents, in a single file dedicated to the document in question, or in multiple coordinated files.

Figure 1:
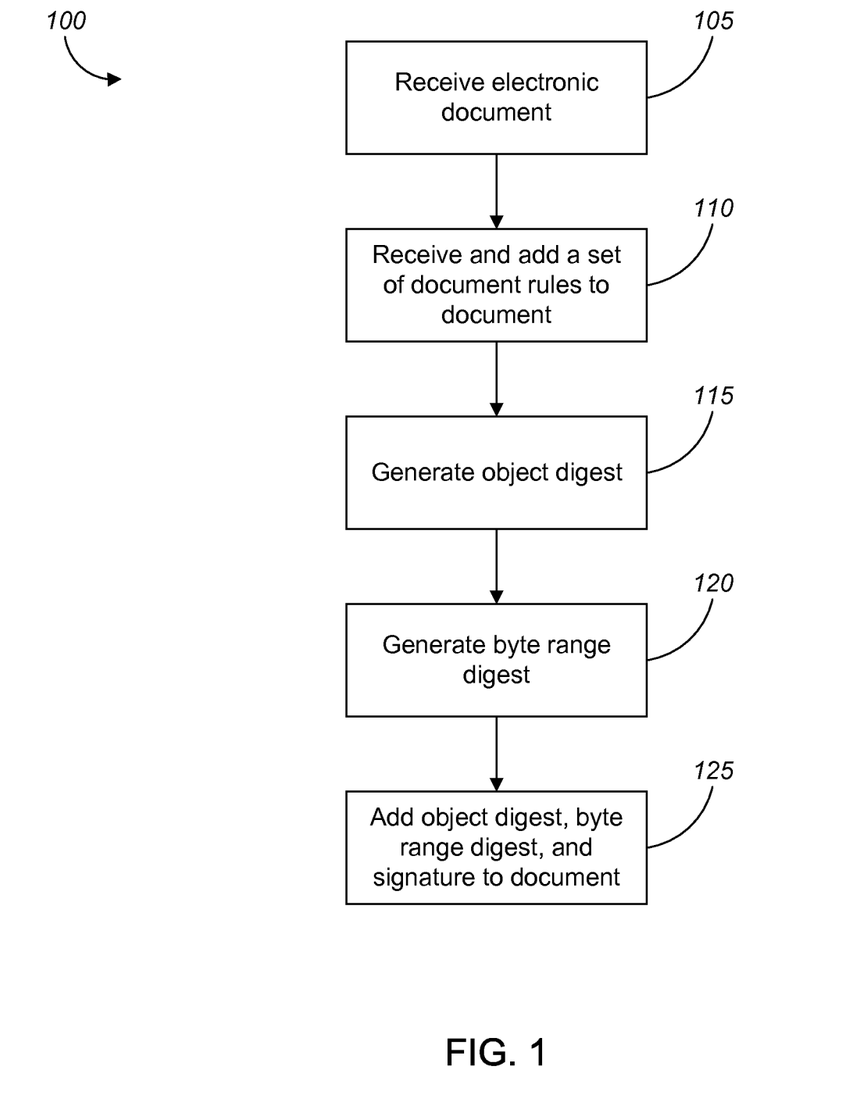
FIG. 1 is a flowchart illustrating a method for generating an electronic document including a set of document rules.

As can be seen in FIG. 1, a method 100 for generating an electronic document begins by receiving an electronic document (step 105). In the present example, the received electronic document is prepared in an authoring software application, such as a PDF authoring application. The electronic document can be authored by an author, that is, the same person who determines what rules should apply to the content of the electronic document, or it can be obtained from a different source. It should be noted that although the invention is explained by way of example, with reference to PDF documents, the techniques described apply to other types of electronic documents or data types in which rules relating to the content of the document can be included.

A set of rules is then received (step 110). The set of rules defines the extent to which changes are authorized to the contents of the electronic document when a user views the electronic document in an electronic document reader. Typically, the set of rules is provided by the author and reflects the author's intent for the document. Alternatively, some or all of the rules can be selected automatically for the document—for example, depending on the document's content and format. Examples of changes that can be allowed by the rules include digitally signing the electronic document (for example, in a predefined signature field), entering data into predefined fields of the electronic document (such as fill-in form fields or importing form data) and annotating the electronic document (such as adding, deleting, editing, or importing comments or annotations). The rules can be received as part of the electronic document, or separately from the electronic document. It should be noted that rules can apply both globally (i.e., to the entire electronic document) or locally (i.e., to an individual content item of the electronic document or to a group of content items in the electronic document). As will be seen below, the rules are specified permanently when the author signs the electronic document. Thus, the rules are made part of what is covered by the author's signature and cannot be modified by any recipients of the document.

Next, an object digest (also referred to as selective digest) is generated (step 115). A digest is generally a piece of data of specific length, calculated from a file or message, in such a way that there is a high probability that any change to the original file or message will result in a change to the digest. The digest typically embodies a one-way mapping function in that is relatively easy to generate the digest from the file or message, but extremely hard to generate the message from the digest. An object digest, as defined in this application, is a digest that is based on selected content items of an electronic document. In particular, in one implementation, the object digest is based on the content items of the electronic document that are not allowed to change based on the rules that the author of the electronic document has assigned—that is, content items that are invariant to authorized changes to the document. For instance, if the rules do not allow alterations of page content, addition or deletion of pages, addition or deletion of form fields, any changes to these types of content items will result in an electronic document having a different object digest. On the other hand, the rules may allow form fill in, addition or deletion of comments, and so on, and such changes will not cause the object digest to change.

To generate the object digest, the rules are first read to determine filter criteria to be used when selecting which objects will be considered in the generation of the object digest. For each content item in the electronic document, it is then determined whether the rules allow the content item to change. If the content item is not allowed to change, then the content item is included in the generation of the object digest. If the content item is allowed to change, then the content item is ignored and not used in creating the object digest. The object digest is generated from content items that reside in the memory of the computer or electronic document reader on which the electronic document is processed, that is, the absolute latest version of the electronic document, which typically corresponds to what is displayed on a computer screen. In one implementation, the object digest is represented as a hash, which acts as a fingerprint of the electronic document and the associated rules, and thus uniquely identifies the electronic document. In another implementation, the object digest acts as a fingerprint of only one or more parts of the electronic document and the rules associated with these parts, and thus uniquely identifies only those specific parts of the electronic document.

A specific implementation of calculating an object digest will be described below with reference to a PDF document. PDF is a file format that is used to represent a document in a format that is independent of the computer software application, hardware, and operating system used to create it. A PDF file contains a PDF document and other supporting data. A PDF document can contain one or more pages. Each page in the document can contain any combination of text, graphics, and images in a device-independent and resolution-independent format. This combination is also referred to as the page description. A PDF document can also contain information possible only in an electronic representation, such as executable code, hypertext links, and so on. In addition to a document, a PDF file contains the version of the PDF specification used in the file and information about the location of different important structures in the file.

A PDF document can conceptually be thought of as having four parts. The first part is a set of basic object types used by PDF to represent content items. Examples of such data types include booleans, numbers, strings, names, arrays, dictionaries, and streams. The second part is the PDF file structure. The file structure determines how the content items are stored in a PDF file, how they are accessed, and how they are updated. The file structure is independent of the semantics of the content items. The third part is the PDF document structure. The document structure specifies how the basic object types are used to represent various parts of a PDF document, such as pages, annotations, hypertext links, fonts, and so on. The fourth and final part is the PDF page description. The PDF page description is a part of the PDF page object, but only has limited interaction with other parts of the PDF document. A further explanation of PDF files and documents can be found in "Portable Document Format Reference Manual" by Tom Bienz and Richard Cohn, Adobe Systems Incorporated, Addison-Wesley Publishing Company, 1993.

In an implementation in which the electronic document is a PDF document, the content items that are evaluated for inclusion/non-inclusion in the object digest can, for example, include: MediaBox regions, CropBox regions, resource dictionaries, and the entire page content stream. In this implementation, the object digest is represented as a hash based on the content items of the document that are invariant to user changes. The hash has a bottom layer, an intermediate layer and a top layer. The bottom layer of the hash is a recursive algorithm and contains the functionality for digesting a basic PDF content item. Simple content items, such as booleans, integers, numbers, strings, and names form the basis of recursion in the bottom layer algorithm. Compound content items, such as dictionaries, arrays, and so on, are digested by recursively digesting the content items making up the compound content items. Special consideration may be necessary for some types of content items, such as PDF language streams (which are combinations of a dictionary and a stream), but ultimately all content items are mapped to a sequence of bytes, which is digested by a byte hashing algorithm. For each content item, an object type identifier and the length of the data being digested is included in the digest along with the digest of the particular content item instance. For example, if the digesting algorithm encounters an integer of value 42, a type identifier corresponding to the integer type will be included in the digest, along with the byte length of the integer when represented as data, along with a four byte value signifying the value 42. This makes it possible to distinguish the integer representation 42 from an identical 4 byte string, and so on.

The hashing algorithm can be a conventional hashing algorithm, such as a SHA-1 algorithm, which is a version of the Secure Hash Algorithm (SHA) and described in the ANSI X9.30 (part 2) standard. SHA-1 produces a 160-bit (20 byte) digest. Similarly, an MD5 hash algorithm, which has a 128 bit (16 byte) digest and often is a faster implementation than the SHA-1 algorithm, can be used. The hashing algorithm must be capable of providing a condensed and unique representation of the invariant document content, so that the result can be used to determine whether unauthorized changes have been made to the document.

The intermediate layer of the object hash contains the functionality for digesting semi-complex content items, such as annotations and form fields. The intermediate layer calls the bottom layer whenever necessary. For every field annotation in the PDF document, the content items can include: an annotation region, a text label for the annotation's pop-up window, a field type, a content stream of the page on which the field annotation resides, a normal appearance stream, a default field value, and if form rights are turned off, an actual field value. PDF form field content items have associated annotation content items. The form field content items are therefore digested by including selected elements from the annotation as well as the field dictionary.

The top layer of the object hash contains the functionality for digesting complex content items, such as pages or an entire PDF document. A PDF page is digested by digesting selected elements from the associated page dictionary. A page template is digested by including a content stream of the page template, and optionally annotations on the page template. An entire PDF document is digested by digesting all the pages, all the form fields, and all page templates, if available.

A few further considerations arise when the hash forming the object digest of a PDF document is generated, as will now be described. First, in order to avoid infinite recursions, the method for creating the object digest keeps track of all indirect content items visited during a recursive descent into each content item. No recursion is performed on an indirect content item that has already been visited once. If an already visited content item is encountered, the object hash generating method merely adds the object type and a fixed integer into the object digest to indicate that the content item was encountered again.

Second, if form fill-in is allowed by the rules set by the author, the content of a value field in a field dictionary of the PDF document is never included in the object digest, since this value could be modified during form fill-in. However, if form fill-in is not allowed, or if some form fields are present before the digest is present and the author wishes to lock these form fields, the content of the value field in the field dictionary of the PDF document is included in the object digest, so that the form fields cannot be changed. In one implementation, it is also possible to select which form fields to include in the object digest, such that some form fields can be changed while others must remain unchanged. The same is true for the content stream of the widget annotation corresponding to a field.

Returning now to FIG. 1, after the object digest has been generated, a byte range digest is generated (step 120). The byte range digest can be described as a "snapshot" of the bytes representing the electronic document as saved on disk. Like the object digest, the byte range digest can be stored as a hash, although this hash is simpler to compute than the object hash, since only a range of bytes are hashed and not any complex objects, which is the case with the object hash. The byte range hash makes it possible for a user to see the version of the document that was signed, since the hash will change between different versions as new bytes are added due to modifications of the document. The byte range hash alone cannot be used to detect or prevent any changes beyond the signed version of the document. For example, the document may contain JavaScripts that execute when the document is viewed. As a result, the document displayed to the user may have a different appearance than the signed version of the document, upon which the byte range hash is based. The combination of the byte range hash and the object hash, however, allows a user to view the version of a document that was actually signed, and provides for control by the author over what changes can be made to the document subsequent to the author's signing of the document. This is possible since the object hash is regenerated every time a user attempts to validate the document. Several types of advanced workflows can be enabled through this mechanism.

Finally, the author adds the object digest, and the byte range digest to the electronic document and signs this aggregate (step 130), which completes the electronic document generating method and results in an electronic document that is ready to be provided to one or more users. The digital signature is a unique sequence of bytes that identifies the author. The form of the digital signature of the electronic document can vary and can be generated from, for example, a document digest that has been encrypted with a public/private key, a biometric signature (such as a fingerprint or a retinal scan), and so on. Signing the electronic document, the MDP settings, and the attestations simply means appending the unique sequence of bytes to the document in such a way that the recipient can read and identify it as a signature document.

Figure 2:
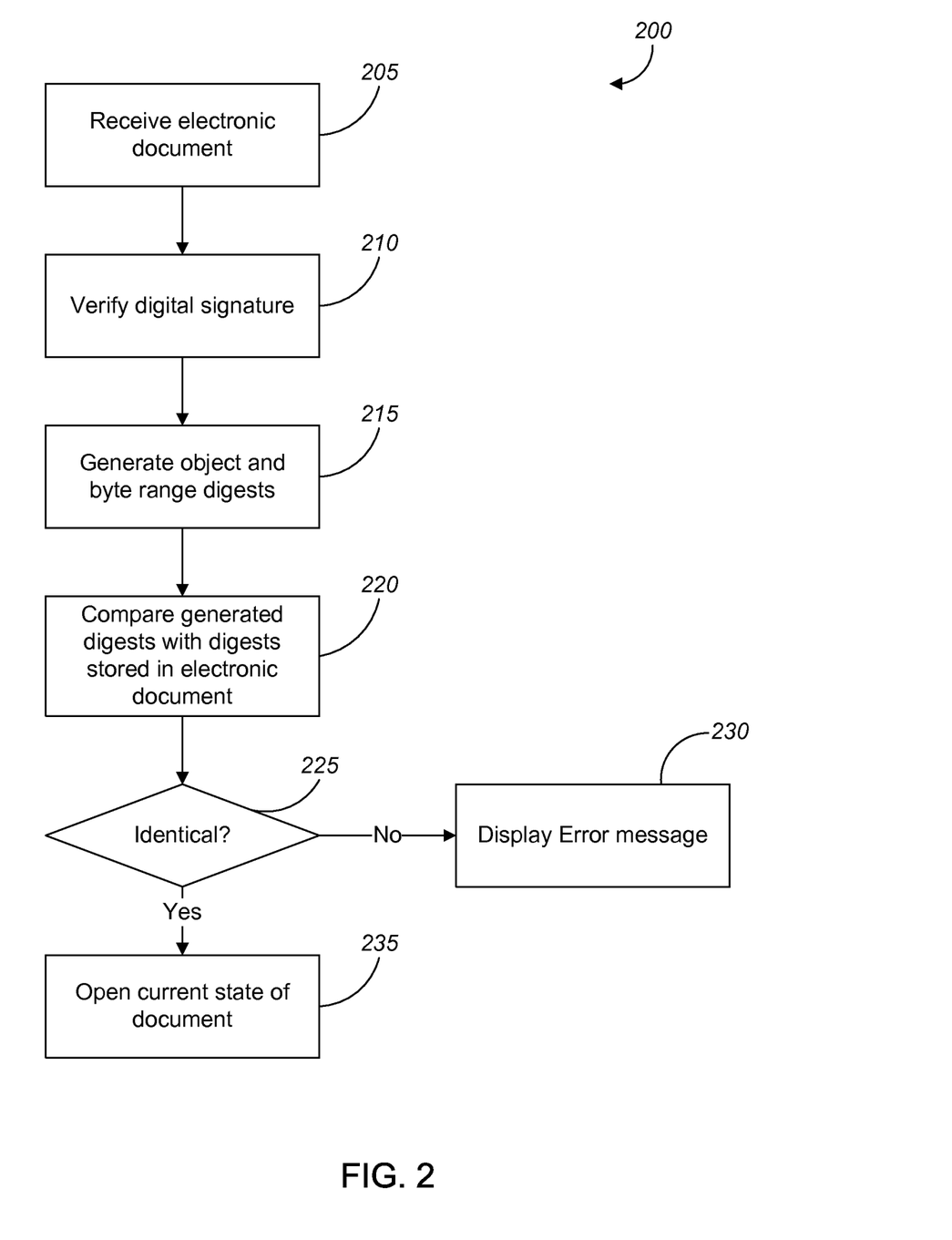
FIG. 2 is a flowchart illustrating a method for detecting unauthorized modifications to an electronic document.

FIG. 2 shows a method 200 for detecting modifications made to an electronic document when the electronic document is opened on a computer or other type of electronic document reader. First, an electronic document signed by an author (and optionally one or more intermediate users) is received along with a set of rules, an object digest, and a byte range digest (step 205). The electronic document can be received by any type of conventional means, such as through a network as e-mail or be downloaded to a user's computer. Alternatively, the electronic document can be stored on some type of carrier for digital data, such as a floppy disk or a CD that is sent or given to a user.

When the document has been received, the electronic document reader verifies the author's (and optionally any intermediate user's) identity (step 210). The verification can, for example, be performed using a public key that matches a private key with which the author signed the electronic document.

The electronic document reader then generates a new object digest and a new byte range digest of the electronic document (step 215). The generation is performed in the same manner as described above with reference to FIG. 1, with the set of rules included in the document as a content filtering guide for the generation of the object digest.

The new object and byte range digests are compared with the signed object and byte range digests that are stored in the electronic document (step 220). The new object digest and byte range digest are identical to the stored object digest and byte range digest, respectively, only if the invariant content items in the electronic document match the electronic document that the author signed. If the new object digest and the stored object digest are identical (the "Yes" branch of step 225), the author's signature is considered to be valid and the electronic document reader opens the electronic document (step 235) in the electronic document reader and the operations that are allowed by the rules can be performed on the electronic document by a user. The opened document that is displayed to the user can be referred to as the current state of the document, as opposed to the signed state, which represents the original document that the author signed. As long as no changes have been made to the document, the current and signed states are identical.

On the other hand, if it is found in step 225 that the new object digest and the stored object digest are not identical (the "No" branch of step 225), an error message is displayed (step 230)—for example, a warning that an unauthorized change has been detected, and/or a warning that the author's (and/or one or more intermediate user's) digital signature is invalid, and the user is prevented from making any modifications to the document.

Figure 3:
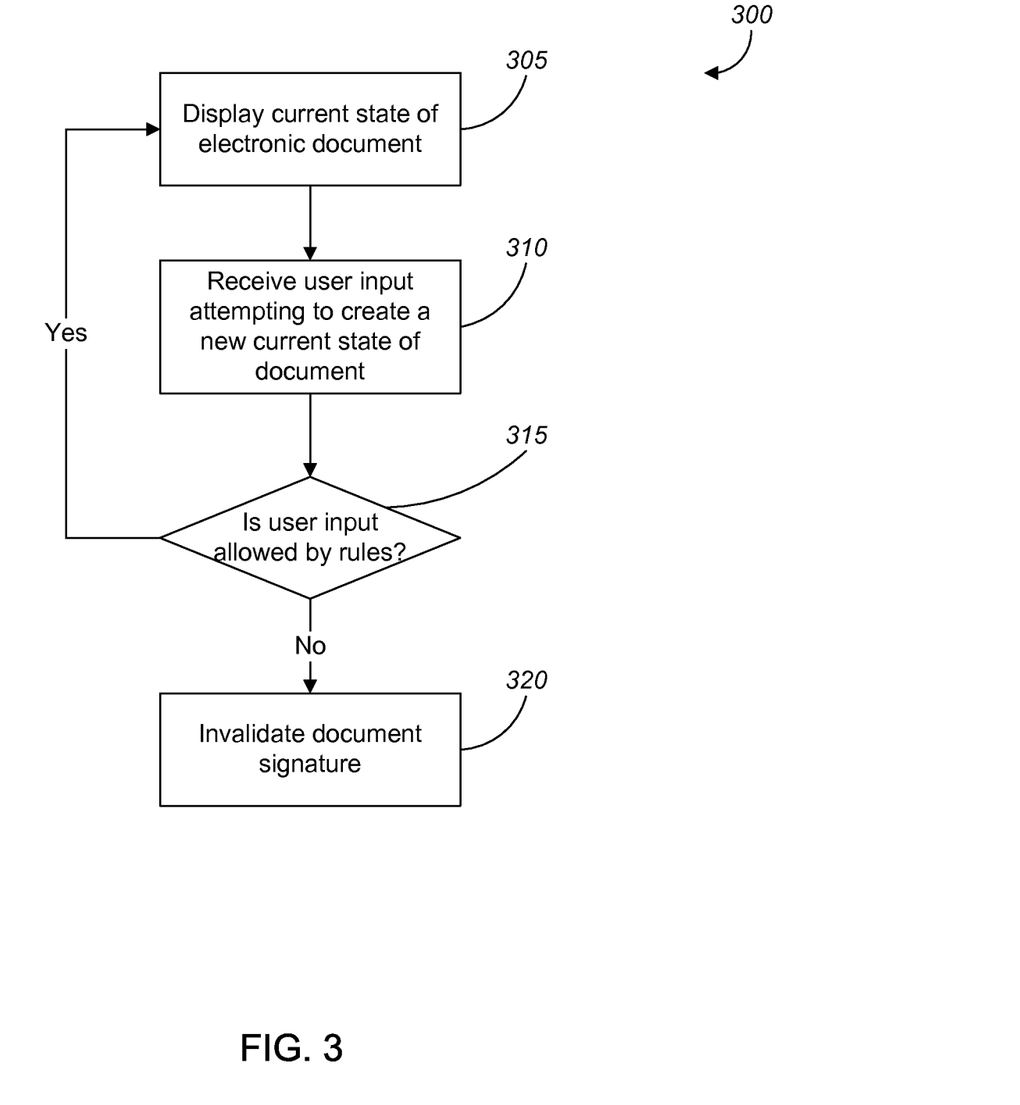
FIG. 3 is a flowchart illustrating a method for preventing unauthorized modifications to an electronic document.

FIG. 3 shows a method 300 for preventing a user from making modifications to a document that are not allowed by the rules established by the author of the document. The method starts with the display in an electronic document reader of the current state of an electronic document (step 305), as described above with reference to FIG. 2. A user input is then received, with the purpose of altering the current state of the electronic document to generate a new current state of the electronic document (step 310). The user input is then checked against the rules established by the author to determine whether the changes proposed by the user are allowed or not (step 315). For example, if the user input describes a modification to an annotation, the user input is checked against any rules relating to annotations of the document to determine whether the modification can take place. If the user input represents an allowed change (i.e. the "Yes" branch of step 315), then the method accepts the change, displays the modified document, and waits for a new user input. However, if the user input does not represent an allowed change (i.e. the "No" branch of step 315), then the prevention method invalidates the author signature (step 320). Consequently, a user cannot make unauthorized changes to the document, since the document in any subsequent workflow steps will have an invalid signature that indicates that the content of the document is not approved by the author and cannot be trusted. Optionally, the method can also reject any unauthorized changes and the display can revert to a previous state (such as the signed state) of the electronic document. Note that some viewing applications may not honor the rules and may therefore permit any changes without restriction, but any unauthorized changes will be detected using the detection method discussed above with reference to FIG. 2.

As was described above, in one implementation, in addition to the rules that have been defined for the document, there may also be a different set of rules that are associated with the user for whom the document is intended. For example, the document may be encrypted in addition to having the rules described above, so that only a particular group of users can access the content of the document. Alternatively, the document may contain additional information about enabling or disabling features of the user's electronic document reader. Together with the rules for the document, these user-specific rules, form a set of user permissions that define which operations a user can perform on the electronic document. The permissions thus constitute the logical "AND" group of the rules defined for the document and the rules defined for the recipient. In the simplest case, there are no user-specific limitations, and the permissions are governed exclusively by the rules of the document.

In another implementation of the invention, it is possible for the author to define operations that are associated with user signatures of the electronic document. The principles of this implementation are easiest described by way of example. Assume that a government agency, such as the Internal Revenue Service (IRS), is the author of an electronic document, for example, a tax form. The tax form contains three signature fields where users may digitally sign the document. For the sake of this example, it can be assumed that the users are a husband, his wife, and their accountant. The author, that is, the IRS, can add rules to the document that define what will happen when each individual user signs the electronic document. For example, there can be a rule for the husband saying "When the husband signs the document, all the fields that relate to his personal income will be locked", a rule for the wife saying "When the wife signs the document, all the fields that relate to her personal income will be locked," and a rule relating to the accountant saying "when the accountant signs this tax form, no more changes can be made." As soon as one of these three people signs the document, all of their fields will be locked according to the rules established by the original author. If an unauthorized change is made to, for example, a field in which the husband's income is listed, the husband's signature will become invalid, while the wife's signature still remains valid. If the accountant had signed the form at the time the unauthorized change was made, the accountant's signature would also become invalid, since the rule for the accountant stated that no field could be changed. This mechanism is possible through the computation of one object digest each that includes the locked fields for the husband, wife, and accountant, respectively, at the time of signing. These individual object digests can then be recomputed and verified, as described above, to make sure that none of the locked fields that were used in computing each respective digest has changed. Many similar scenarios can be constructed in which parts of documents are signed by different users and only a particular part becomes invalid in the event of unauthorized changes being made to the electronic document.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. The processes above have been described for situations with only one author, but in some situations there may also be an original author and one or more subsequent authors in a workflow who may change the rules associated with the entire document, or parts of the document. The methods discussed above also allow these additional authors to supply their signatures as author signatures in addition to the original author, and a chain of signatures can be created in which permissions on each level may vary.

What is claimed is:

1. A computer-implemented method comprising:
receiving, by a computing device processor, an electronic document including a plurality of content items, a rule, a first digest, and a digital signature of a document author, wherein the rule identifies a subset of the content items that are invariant to operations authorized by the rule;
generating a second digest for the electronic document by digesting the subset of content items that are invariant to operations authorized by the rule, wherein content items that are modifiable pursuant to the rule are not considered in generating the second digest;
comparing the first and second digests;
invalidating the digital signature of the document author in response to detecting a discrepancy between the first and second digests, and
restricting access to the electronic document in response to detecting the invalidated digital signature.

2. The method of claim 1, wherein the digital signature identifies the document author as an originator of the rule.

3. The method of claim 1, wherein:
generating the second digest includes using a multi-layer hash function that includes a bottom layer and an intermediate layer;
the bottom layer provides recursive digesting functionality; and
the intermediate layer provides annotation digesting functionality and is configured to call the bottom layer.

4. The method of claim 1, wherein the content items that are modifiable pursuant to the rule include a fillable form field in the electronic document, such that manipulating data provided in the fillable form field does not affect the second digest.

5. The method of claim 1, wherein the electronic document represents an existing signed state, the method further comprising generating a new signed state of the electronic document that comprises the second digest, a second rule, and a second digital signature.

6. A computer-implemented method comprising:
receiving, by a computing device processor, an electronic document including a plurality of content items, a rule, a first digest, and a digital signature of a document author, wherein the rule identifies a first subset of the content items that are invariant to operations authorized by the rule;
generating a second digest for the electronic document by digesting the first subset of content items that are invariant to operations authorized by the rule, wherein content items that are modifiable pursuant to the rule are not considered in generating the second digest;
after determining that the first and second digests are identical, (a) receiving input attempting to create a new state of the electronic document, (b) determining whether the input is allowed by the rule, and (c) invalidating the digital signature of the document author if the input is not allowed by the rule; and
restricting access to the electronic document in response to detecting the invalidated digital signature.

7. The method of claim 6, wherein the content items that are modifiable pursuant to the rule include a fillable form field.

8. The method of claim 6, the method further comprising rendering the electronic document such that at least a portion of the content items are displayed, including at least a portion of the first subset of content items that are invariant to operations authorized by the rule.

9. The method of claim 6, wherein the rule identifies at least one form field that is fillable without invalidating the digital signature.

10. The method of claim 6, wherein:
the rule specifies a particular content type; and
content items associated with the particular content type are not considered in generating the second digest.

11. The method of claim 6, wherein:
the rule specifies a second subset of content items that are specified based on user interaction with a particular content item that is not included in the first subset; and
the first and second subsets of content items form part of the plurality of content items included in the electronic document.

12. The method of claim 6, further comprising comparing the first and second digests.

13. A computer readable storage device storing a computer program which, when executed by one or more computer processors, causes the one or more computer processors to perform operations comprising:
receiving, by a computing device processor, an electronic document including a plurality of content items, a rule, a first digest, and a digital signature of a document author, wherein the rule identifies a subset of the content items that are invariant to operations authorized by the rule;
generating a second digest for the electronic document by digesting the subset of content items that are invariant to operations authorized by the rule, wherein content items that are modifiable pursuant to the rule are not considered in generating the second digest;
invalidating the digital signature of the document author in response to detecting a discrepancy between the first and second digests and
restricting access to the electronic document in response to detecting the invalidated digital signature.

14. The computer readable storage device of claim 13, wherein the first digest is generated before the second digest.

15. The computer readable storage device of claim 13, wherein the operations further comprise receiving input that creates a new state of the electronic document, wherein the second digest corresponds to the new state of the electronic document.

16. The computer readable storage device of claim 13, wherein the content items that are modifiable pursuant to the rule include a fillable form field.

17. The computer readable storage device of claim 13, wherein:
the first digest comprises a previous byte range digest,
generating the second digest further comprises generating a current byte range digest by digesting certain bytes of the electronic document, and
the operations further comprise comparing the current byte range digest with the previous byte range digest.

* * * * *